United States Patent [19]

Flandorfer

[11] 4,206,394

[45] Jun. 3, 1980

[54] MOTOR CONTROL CIRCUIT

[75] Inventor: Robert Flandorfer, Frankfurt am Main, Fed. Rep. of Germany

[73] Assignee: Braun Aktiengesellschaft, Frankfurt am Main, Fed. Rep. of Germany

[21] Appl. No.: 917,529

[22] Filed: Jun. 21, 1978

Related U.S. Application Data

[63] Continuation-in-part of Ser. No. 677,823, Apr. 16, 1976, abandoned.

[30] Foreign Application Priority Data

Apr. 26, 1975 [DE] Fed. Rep. of Germany ....... 2518676

[51] Int. Cl.² .............................................. G05F 1/08
[52] U.S. Cl. ................................ 318/640; 318/294; 318/681
[58] Field of Search ............... 318/294, 681, 640, 480

[56] References Cited

U.S. PATENT DOCUMENTS

| | | | |
|---|---|---|---|
| 3,260,912 | 7/1966 | Gregory | 318/681 X |
| 3,378,740 | 4/1968 | Cruel | 318/681 X |
| 3,427,520 | 2/1969 | Oppedahl | 318/294 X |
| 3,477,004 | 11/1969 | Westbrook | 318/294 |
| 3,652,913 | 3/1972 | Leland | 318/681 X |
| 3,809,981 | 5/1974 | Maida | 318/294 |

*Primary Examiner*—B. Dobeck
*Attorney, Agent, or Firm*—Frederick E. Bartholy

[57] ABSTRACT

A motor control circuit of the Wheatstone bridge type is described for driving a direct current motor, selectively, in one direction or the other for the general purpose of automatically setting the diaphragm of a photographic camera in accordance with the light impinging on a photo-responsive element.

3 Claims, 1 Drawing Figure

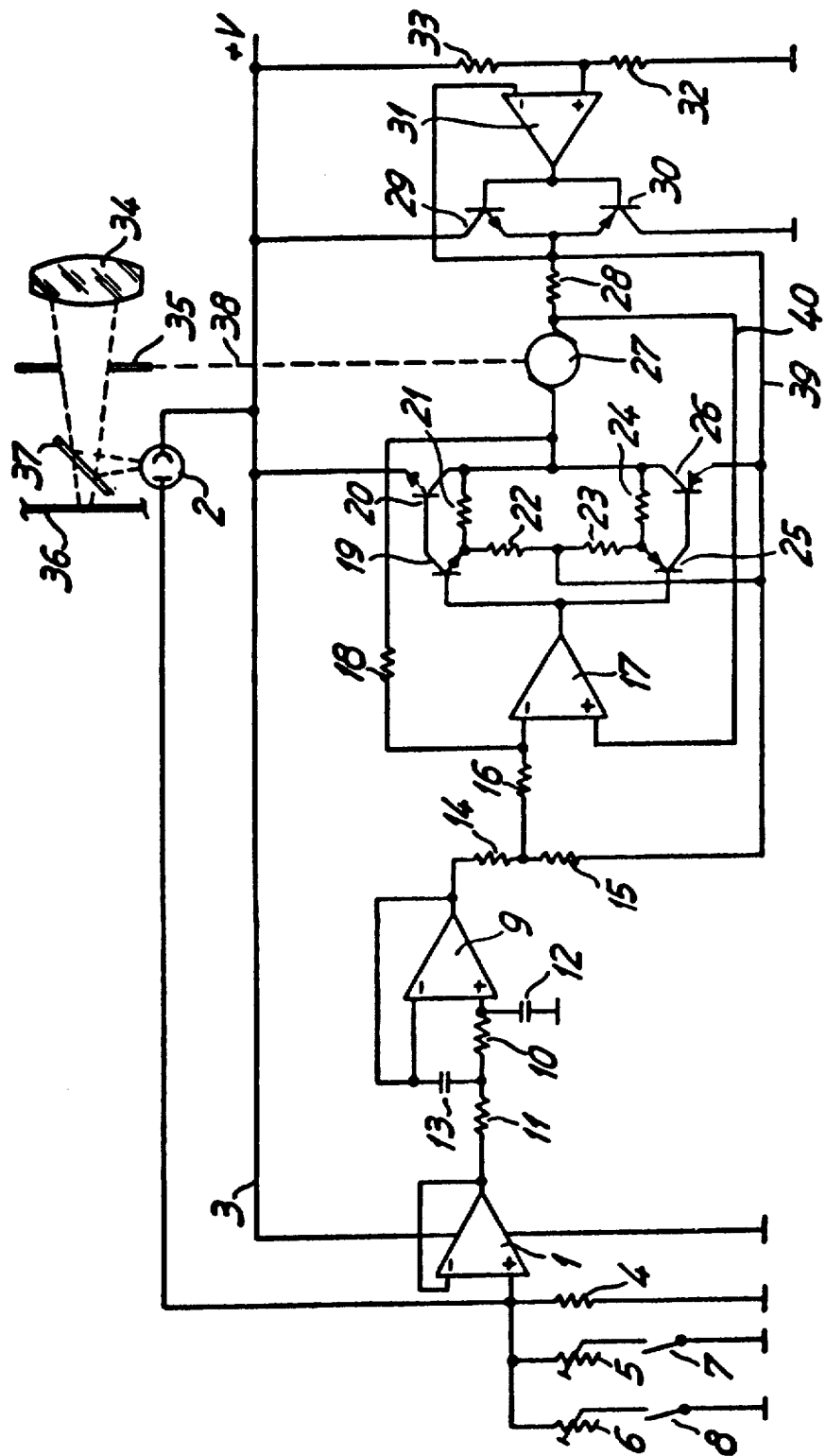

MOTOR CONTROL CIRCUIT

This is a continuation-in-part of my pending application Ser. No. 677,823 filed Apr. 16, 1976 now abandoned.

The invention is directed to a circuit arrangement for a motor control, including a bridge circuit, the condition of balance of which determines the motor drive. The latter is controlled by a sensing element responsive to the position of a control element actuated by the motor.

Control circuits heretofore used have the drawback that the response of the circuit is influenced by the load on the motor. Consequently, the motor may run at an undesirably low speed or may overrun its balanced position due to excessive speed. This results in a condition known as "hunting".

It is more pronounced the greater the load variations are over a given control range setting. An example of attempting to prevent overrun of a motor actuated by a particular type of bridge circuit is seen in U.S. Pat. No. 3,809,981 where the terminals of the motor are electrically short circuited by means of contacts of a relay.

It is a primary object of the invention to provide a motor control circuit of the type mentioned, which has a fast response and is free from overshoot which would cause oscillation and needs no short circuiting of its terminals for proper stopping.

These and other objects are realized by the features that the control circuit includes a feedback loop responsive to the load of the motor and that an electrical braking means is provided for the motor. A relatively low resistance bridge circuit is used for the drive having feedback loops, one of which operates as a braking arrangement.

A further design feature is evidenced in that the braking means comprises a controllable auxiliary circuit connected across the terminals of the d.c. motor.

In all of the electrical circuit configurations of the braking means or arrangement, the advantage of further modification lies in the fact that the braking effect may be controlled as a function of the supply voltage across the motor. In this manner, it is feasible to achieve a control such that at a high voltage across the motor, i.e., when the bridge circuit is highly unbalanced, there is small braking effect whereas, at a low voltage across the motor, an increased braking action is obtained. In this manner, a considerable increase in the speed of response is obtained without incurring instability or overshoot of the control function.

The invention is fully described in connection with the accompanying drawing, representing a circuit diagram of a preferred embodiment.

Referring to the drawing, it is seen that an operational amplifier 1 is provided, the inverting input of which is connected to its output, thus forming an impedance converter. A voltage divider is formed of a photoresistor 2, and of a resistor 4, which are connected in series between the positive lead 3 and the grounded negative lead of a power supply source (not shown). The junction point of photoresistor 2 and resistor 4 is connected to the non-inverting input of operational amplifier 1. In parallel by the resistor 4, adjustable resistors 5 and 6 may be connected by means of switches 7 and 8, respectively, in order to adjust the desired value.

The output of the operational amplifier 1 connects to an active low-pass filter comprising the operational amplifier 9, the output of which is connected to its inverting input. The non-inverting input of amplifier 9 connects to the output of the operational amplifier 1 by means of resistors 10 and 11 arranged in series. A capacitor 12 is connected between the non-inverting input and ground. Another capacitor 13 interconnects the inverting input of the operational amplifier 9 and the interconnected terminals of resistors 10 and 11.

The output of operational amplifier 9 is coupled to the inverting input of operational amplifier 17 via resistors 14 and 16. The junction point of the aforementioned resistors is connected to a resistor 15, the other end of which leads to the inverting input of operational amplifier 31.

A d.c. motor 27 is provided to actuate the diaphragm 35, the latter being arranged in the light path between the lens 34 of a camera and the film 36. The mechanical connection with the motor is shown merely by dotted lines.

A partly transparent mirror 37 is arranged in the light path so as to deflect part of the light which has passed the diaphragm 35 onto the photoresistor 2. The controllable diaphragm 35 and its mechanical coupling to the d.c. motor 27 may be of conventional design and is shown here merely to illustrate the application of the control circuit.

The d.c. motor 27 is energized by a transistor circuitry in a Wheatstone bridge arrangement. NPN transistors 19 and 20 are connected to a Darlington arrangement, the emitter of transistor 19 being connected to the collector of transistor 20 via a resistor 21. Similarly, PNP transistors 25 and 26 are connected in a Darlington arrangement in that the emitter of transistor 25 is connected to the collector of transistor 26 via a resistor 24. The emitter of each of the transistors 19 and 20 is connected via resistors 22 and 23, respectively, to conductor 39, which connects to the inverting input of operational amplifier 31. The line 39 has a voltage of about half that of the power supply source as will be described later on in more detail.

The Darlington transistor pairs 19, 20, and 25, 26 are connected in a push-pull arrangement. The emitter of transistor 20 is connected to the positive power supply line 3, and the emitter of transistor 26 is connected to the negative or ground line 39. The collector electrodes of transistors 20 and 26 are interconnected and are coupled to one terminal of the motor 27 and also via a resistor 18 to the inverting input of the operational amplifier 17, the output of which is connected to the base electrodes of transistors 19 and 25. The other terminal of the motor 27 is connected to the noninverting input of operational amplifier 17 and also to line 39 via a resistor 28.

Another push-pull transistor arrangement consists of NPN transistor 29 and PNP transistor 30, the emitter electrodes of which are connected to line 39, and the base electrodes of which are connected to the output of the operational amplifier 31. The collector of transistor 29 is connected to the positive power supply line 3, whereas the collector of transistor 30 is grounded.

Resistors 32 and 33 form a voltage divider, and the junction point of both these resistors is connected to the non-inverting input of operational amplifier 31.

Transistors 20 and 26 form one arm of a Wheatstone bridge and transistors 29 and 30 the other arm thereof.

The assembly comprising transistors 29 and 30 and operational amplifier 31 serve as a voltage divider having a low internal resistance. This is achieved by a feedback connection from the emitters of transistors 29 and 30 to the inverting input of operational amplifier 31.

Continuing with the description of the circuit, in the example shown, the diaphragm 35 represents a load on the motor 27. In moving the diaphragm, the current will accordingly tend to increase, resulting in a higher voltage drop across resistor 28. Consequently, a higher voltage will appear at the non-inverting input of operational amplifier 17. This will result in an increase of the voltage fed to the motor 27. In this manner, various load conditions of the motor are counteracted, i.e., compensated. From the above, it is evident that the resistor 28 acts as a sensor of load conditions. By means of the interconnection with the non-inverting input of amplifier 17, it provides forward feed to increase the voltage to the motor 27 in accordance with the load conditions.

The above feedback will also lead to a non-linear characteristic of the control mechanism. Let us assume that the bridge circuit is highly unbalanced. This would lead to a bridge voltage that is higher than it would be without the provision of the feedback loop 40. Thus, motor 27 would rotate at a relatively high speed. Whereas, if the bridge circuit is unbalanced to a small extent only, there will only appear a small voltage on line 40, and therefore the motor 27 will rotate at a relatively low speed. Such a control characteristic is advantageous since it avoids overshoot of the control mechanism and instabilities.

In many motion picture cameras, the light impinging on the photoresistor 2 is chopped by the shutter of the camera. Consequently, the voltage at the output of operational amplifier 1 would be intermittent. The low pass filter comprising operational amplifier 9, resistors 10, 11, and condenser 12, eliminates these extreme level changes, which would otherwise disturb the correct operation of the Wheatstone bridge arrangement. By the use of such a low pass filter instead of an integrating network used hitherto, a faster response of the control mechanism is achieved.

Resistor 18 provides a negative feedback of the circuit comprising operational amplifier 17 and Darlington transistor push-pull arrangement 19, 20, 25, 26 and has the purpose of decreasing the internal or source resistance of this circuit to a relatively low value. Thus, the motor 27 will be substantially short-circuited even if the bridge arrangement is balanced. Since the motor 27 is of a type having a permanent magnet field, short circuiting or bridging the motor by the internal or source resistance of the aforementioned transistor push-pull arrangement provides a variable smooth braking effect.

The left-hand terminal of motor 27 is connected to the collectors of transistors 20 and 26 may have a voltage level which is higher than the voltage on line 39, depending on the light intensity falling on photoresistor 2. Accordingly, the motor 27 will rotate in one or in the other direction in response to the polarity of the voltage across the terminals thereof.

Variations of the load of the motor 27 may also occur due to friction of the diaphragm and of the gear coupling thereof.

It should be noted that although friction may be low, its effect on the motor 27 may nevertheless be high, since the motor should be as compact and small as feasible in order to reduce space requirements and costs.

Resistors 5 and 6 serve for adjusting the gain or sensitivity of the control circuit in accordance with the film speed.

In a practical embodiment, the following components have been used:

1 = operational amplifier μA 709 (Fairchild)
2 = photoresistor CL 9 P 5 HL (Clairex)
4 = resistor 10 Megohm
5 = resistor 2,2 Megohm
6 = resistor 470 Kiloohm
9 = operational amplifier μA 709
10 = resistor 390 Kiloohm
11 = resistor 390 Kiloohm
12 = capacitor 0,1 Microfarad
13 = capacitor 0,22 Microfarad
14 = resistor 100 Ohm
15 = resistor 68 Ohm
16 = resistor 10 Kiloohm
17 = operational amplifier μA 709
18 = resistor 10 Kiloohm
19 = transistor ZTX 108
20 = transistor BC 328
21 = resistor 1 Kiloohm
22 = resistor 470 Ohm
23 = resistor 470 Ohm
24 = resistor 1 Kiloohm
25 = transistor ZTX 500
26 = transistor BC 338
27 = d.c. motor internal resistance 24 Ohm
28 = resistor 24 Ohm
29 = transistor BC 338
30 = transistor BC 328
31 = operational amplifier μA 709
32 = resistor 10 Kiloohm
33 = resistor 10 Kiloohm

What is claimed is:

1. In a control circuit for the bidirectional actuation of a d.c. motor that is coupled to a positioning element, including a d.c. voltage source, a bridge circuit comprising at least two transistors in a push-pull circuit arrangement, a voltage dividing means for said source, a first sensor (2) responsive to the position of said positioning element (35) and connected to an input of said bridge circuit, the improvement which comprises a feedback network including (a second sensor (28) responsive to the current through said d.c. motor and connected to an input of said push-pull circuit such that it tends to increase the voltage fed to the d.c. motor whenever the load of the same is increased, and a negative feedback network (18) leading from the output of the push-pull circuit to an input of said bridge circuit and dimensioned such that the internal resistance of said push-pull circuit is substantially reduced.)

2. A control circuit in accordance with claim 1 wherein said voltage dividing means comprises a pair of resistors in series between terminals of said supply source and a transistor push-pull circuit including a negative feedback loop reducing the internal resistance of said circuit.

3. A control circuit as claimed in claim 2 wherein said negative feedback loop in said second push-pull circuit incorporates an operational amplifier (31).

* * * * *